Dec. 12, 1944. M. A. WECKERLY 2,364,832
CLASSIFYING SCALE
Filed Sept. 26, 1941  4 Sheets-Sheet 1
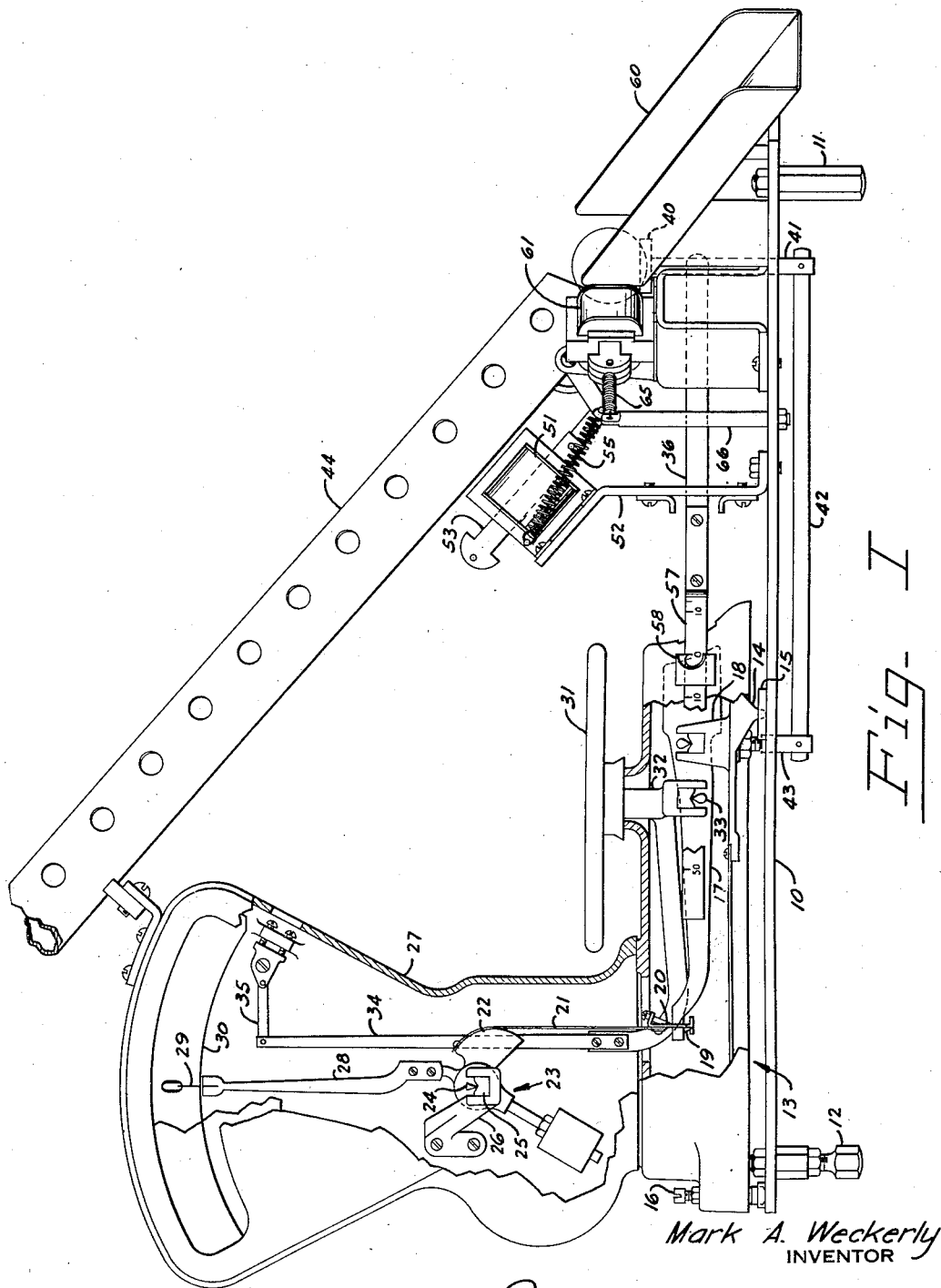
Fig. I
Mark A. Weckerly
INVENTOR
BY Marshall & Marshall
ATTORNEYS

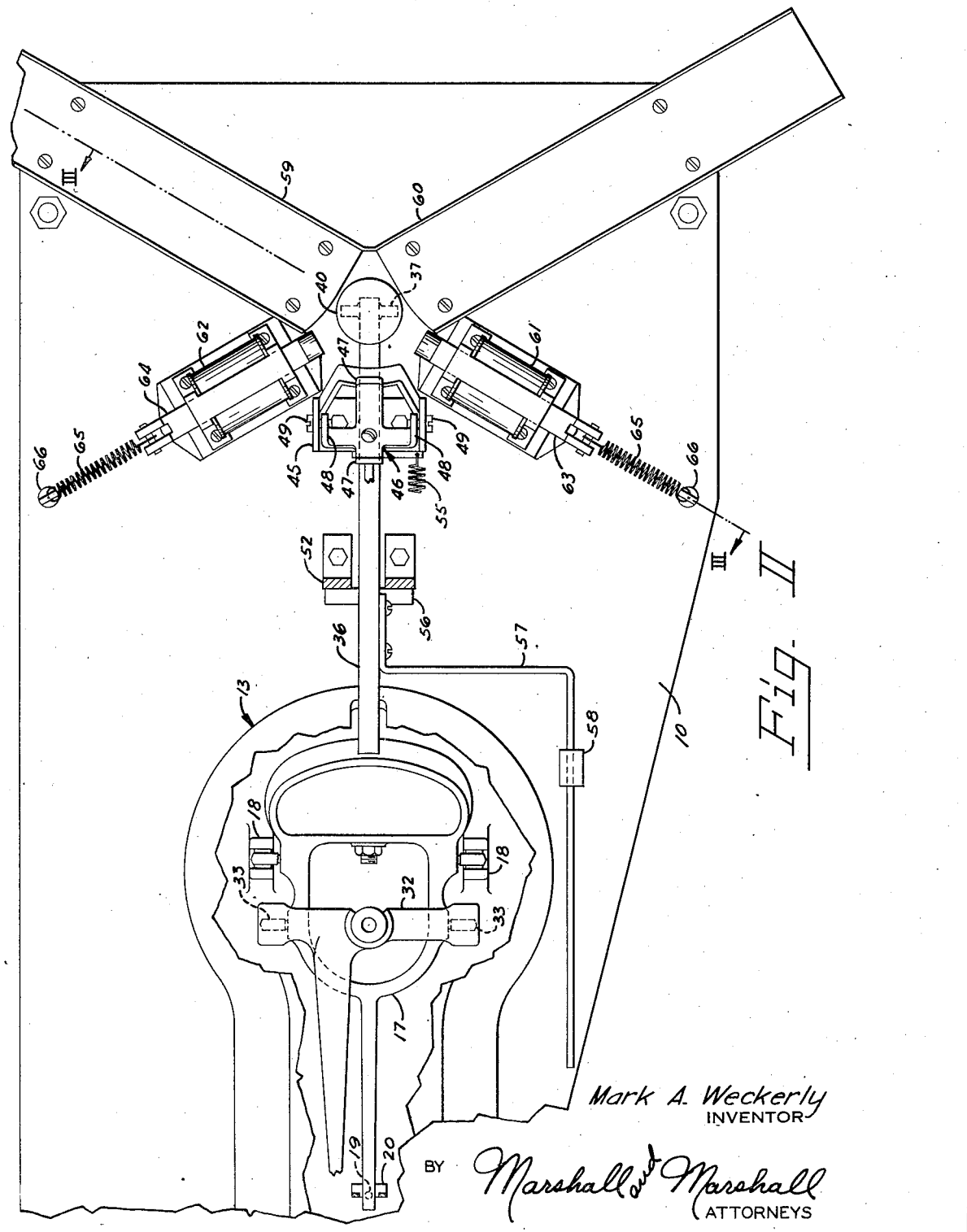

Dec. 12, 1944.    M. A. WECKERLY    2,364,832
CLASSIFYING SCALE
Filed Sept. 26, 1941    4 Sheets-Sheet 3
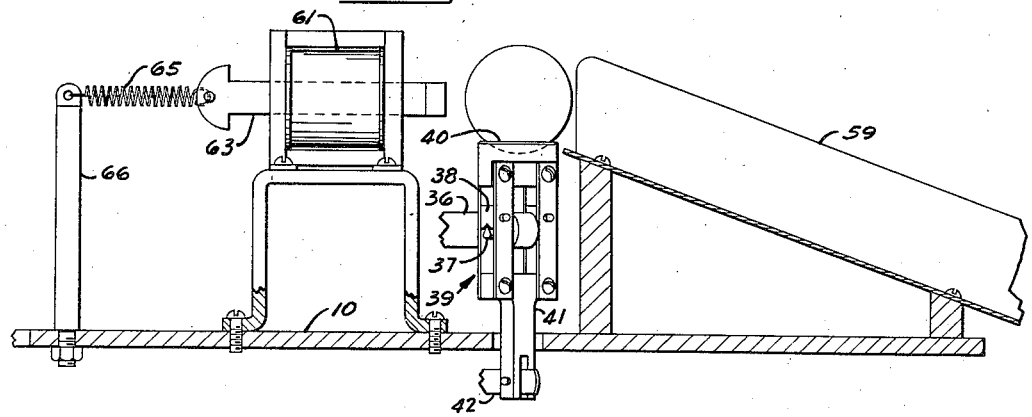
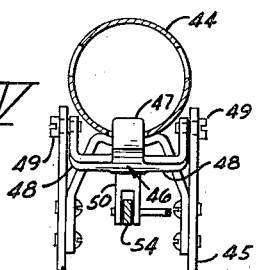
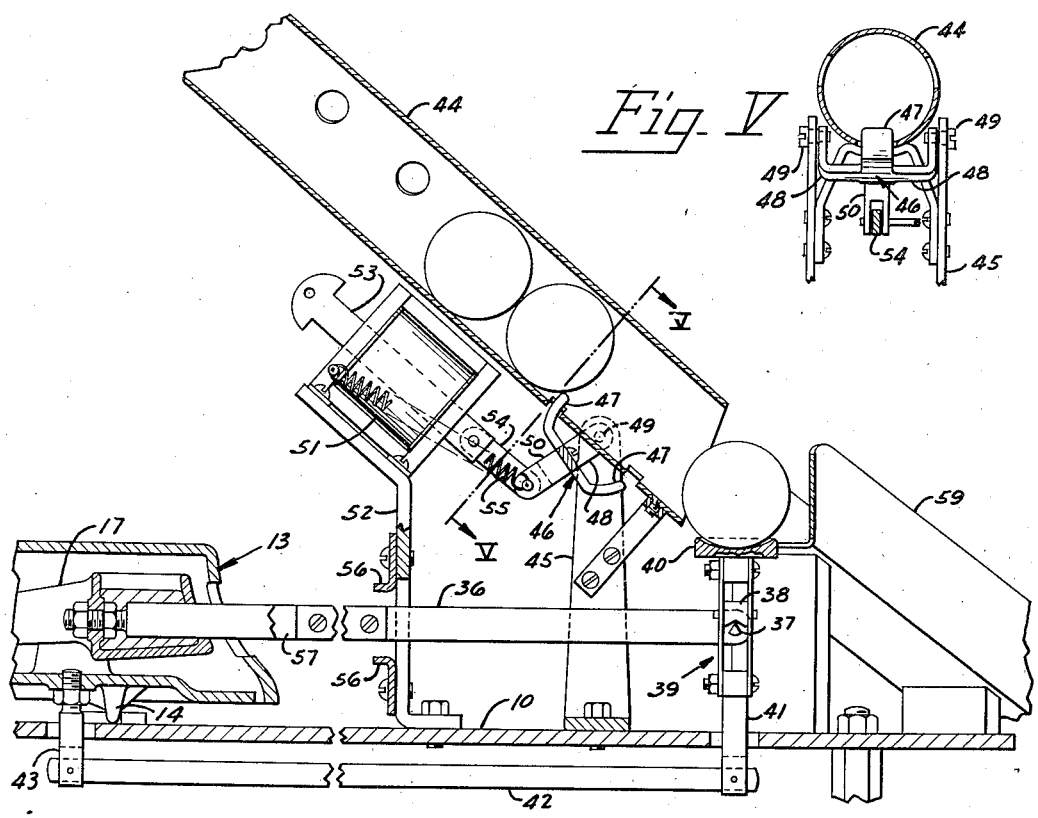
Mark A. Weckerly
INVENTOR
BY Marshall & Marshall
ATTORNEYS Dec. 12, 1944.　　　M. A. WECKERLY　　　2,364,832
CLASSIFYING SCALE
Filed Sept. 26, 1941　　　4 Sheets-Sheet 4
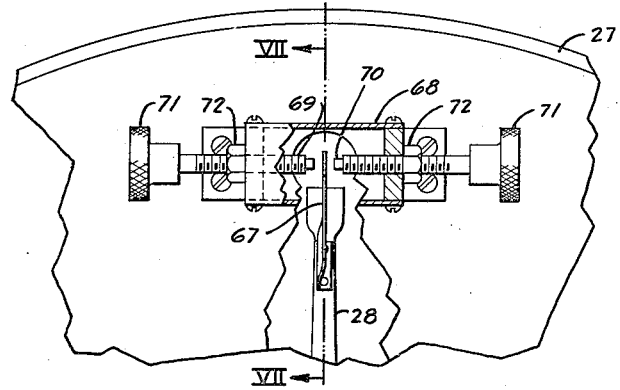
_Fig. VI_
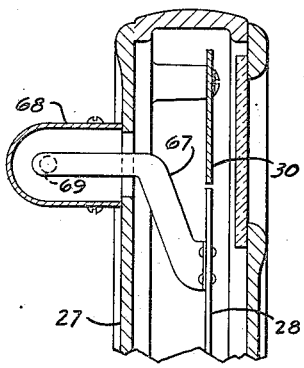
_Fig. VII_
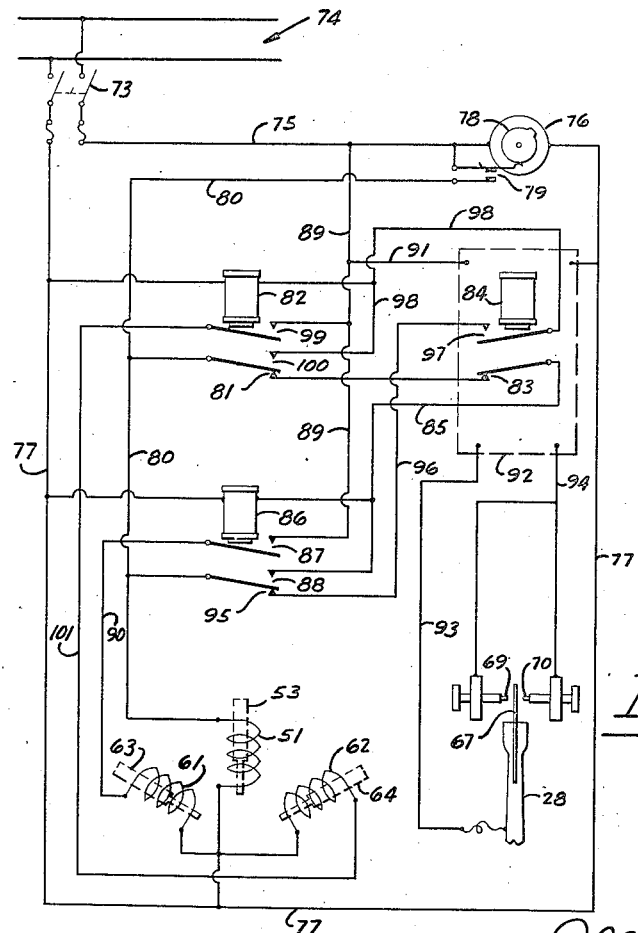
_Fig. VIII_
Mark A. Weckerly
INVENTOR
BY Marshall and Marshall
ATTORNEYS Patented Dec. 12, 1944

2,364,832

UNITED STATES PATENT OFFICE 2,364,832

CLASSIFYING SCALE

Mark A. Weckerly, Toledo, Ohio, assignor to Toledo Scale Company, Toledo, Ohio, a corporation of New Jersey Application September 26, 1941, Serial No. 412,456

2 Claims. (Cl. 209—121)

This invention relates to weighing scales, and more particularly to scales for continuously weighing and grading similar articles which must fall within certain close tolerances to be acceptable.

In modern manufacturing methods, which depend to a great extent for their success on rapidity of production and standardization of the articles produced, many devices are employed for rapidly testing, by means of weight, or other dimension, such articles as are being manufactured. This is particularly true in the manufacture of packaged goods and in the manufacture of various classes of articles in which each individual item must conform, as nearly as possible, to every other like item. Examples of this latter classification of goods are balls for various sports which must be weighed to close tolerances to guarantee certain performance, identical parts for motors or engines and many other standardized parts, accessories or articles.

Various methods for testing and grading such standardized articles have been devised. Among these are conveyor belt scales which reject items falling without the tolerance as they pass over the weighing scale on a conveyor belt, rotary table scales comprising one or more scales mounted on a rotary table which receive the article to be weighed in one position and while rotating weigh and grade it, and scales which are manually operated and which merely indicate whether or not the article placed thereon falls within the established tolerance. It is particularly difficult when using any of these systems to handle spherically shaped articles and, therefore, articles such as golf balls, tennis balls, etc., have usually been weighed individually and by means of manual operations.

It is an object of this invention to provide an automatic repetitive weighing scale for feeding and grading spherical articles, such as golf balls, rapidly and accurately to within close tolerances.

It is a further object of this invention to provide a weighing scale for weighing articles which must be manufactured within close tolerances to determine if such articles fall within such tolerances and, if they do not, to reject them.

It is a further object of this invention to provide apparatus for grading articles according to weight and for rejecting those which fall without established weight tolerances.

More specific objects and advantages are apparent from the description, in which reference is had to the accompanying drawings illustrating a preferred form of scale embodying the invention.

In the drawings:

Fig. I is a view in elevation of a weighing scale embodying the invention, parts being shown in section and parts being broken away.

Fig. II is a fragmentary plan view on a slightly larger scale of the device shown in Fig. I, certain parts being broken away and certain parts being shown in section.

Fig. III is a vertical sectional view, taken from the position indicated by the line III—III of Fig. II.

Fig. IV is a vertical sectional view on a larger scale of a portion of the mechanism shown in Fig. I and illustrating in particular a feeding device and the parts associated therewith.

Fig. V is a sectional view, taken substantially on the line V—V of Fig. IV.

Fig. VI is a fragmentary view in elevation of sensing mechanism incorporated within the device shown in Fig. I.

Fig. VII is a fragmentary vertical sectional view, taken substantially on the line VII—VII of Fig. VI.

Fig. VIII is a schematic wiring diagram illustrating an electrical circuit for the operation of the device shown in Fig. I.

These specific drawings and the specific description that follows merely disclose and illustrate the invention and are not intended to impose limitations upon the claims.

A main base 10 is supported on legs 11 and 12, the latter of which is adjustable for leveling the device. Located on the base 10 is a scale base 13, similarly supported by solid legs 14 which are located in sockets 15 mounted on the base 10, and an adjustable leg 16. A main lever 17 is pivotally mounted on fulcrum stands 18 which are located within the scale base 13. The lever 17 extends horizontally within the base 13 and has a point pivot 19 located at its nose end. The pivot 19 rests in a stirrup 20 which is attached to the lower end of a vertically extending metallic ribbon 21. The ribbon 21 overlies the face of a sector cam 22, to which it is attached, which cam forms a portion of a load-counterbalancing pendulum 23 supported on pivots 24 in bearings 25 which are mounted in a bracket 26 attached to the interior of a scale housing 27. Secured to the pendulum 23 is an indicator 28 which cooperates with an indicium 29 located on a chart 30 mounted in the upper portion of the housing 27.

A platter 31 is mounted on the upper end of a platter spider 32 which is supported on load pivots 33 of the main lever 17. One arm of the spider 32 extends horizontally, substantially parallel to the lever 17 and a bar 34 attached thereto extends upwardly into the housing 27 where it is pivotally connected to a horizontally disposed link 35, the other end of which is pivoted in a bracket attached to the housing 27. The bar 34 and the link 35 and the horizontal arm of the spider 32 act as a check for the platter 31 to maintain its horizontal position. An extension arm 36 (see also Figures II and IV) is fixedly attached to the end of the lever 17 and extends out through an opening in the end of the base 13. The extension arm 36 has a load pivot 37, mounted at its outermost end, on which is supported, by means of bearings 38, a frame 39. The frame 39 carries at its upper end a disk-like receiver 40 which has a concave depression in its upper surface. Extending downwardly from the frame 39 is a T-shaped bar 41, the lower arm of which is forked and between the bifurcations of which is pinned a horizontally extending link 42. The link 42 is parallel to the extension arm 36, and its other end is pivotally connected in a slotted rod 43 extending downwardly from the base 13. The bar 41, link 42 and rod 43 form a checking parallelogram for the receiver 40 to insure its vertical position and movement.

A feeding trough or tube 44 is supported above the mechanism just described, resting on a bracket on the housing 27 and on a stand 45 with its lower end located above and slightly to one side of the receiver 40. A cross-shaped feeding latch 46 has two arms 47 which extend longitudinally of the tube 44, and two arms 48 at right angles thereto. The arms 48 are bent upwardly near their ends (Fig. V) and pivotally support the latch 46 in the stand 45 by means of screws 49 which extend through oversized holes in the stand 45 and are screwed into the ends of the arms 48. The latch 46 also has a bifurcated body 50 which extends downwardly from the intersection of the pairs of arms 47 and 48.

A feeding solenoid 51 is mounted in a bracket 52 attached to the base 10 with its core rod 53 parallel to the longitudinal axis of and located immediately beneath the feeding tube 44. The lower end of the core rod 53 is connected to the lower end of the body 50 by means of a link 54. A spring 55 is connected between the lower end of the body 50 and the solenoid 51 to retain the latch 46 and the core rod 53 in the position shown in Fig. IV. The two arms 47 of the latch 46 are alternately insertable into the tube 44, through holes cut in the wall thereof, by the rocking action of the latch 46, which is caused by reciprocal movement of the core rod 53. The spread of the two arms 47 is slightly less than the diameter of the articles being tested or the diameter of the feeding tube 44.

The bracket 52 straddles the extension arm 36 and two transverse horizontal angle brackets 56 are attached thereto, one located above and one below the extension arm 36 to limit its angular movement. A substantially S-shaped tare beam 57 (Fig. II) is bolted on the extension arm 36. One arm of the beam 57 is parallel to the extension arm 36 and carries a slidable poise 58.

Two inclined troughs 59 and 60 have their upper ends located one on each side of the receiver 40, the horizontal angular relationship between the troughs 59 and 60 and between the troughs and the tube 44 being approximately even. Solenoids 61 and 62 are mounted on the opposite side of the receiver 40 from the upper open ends of the troughs 59 and 60 respectively. Each of the solenoids 61 and 62 has a core rod 63 and 64 respectively which are yieldably held out of the position they assume when the solenoids are energized by means of springs 65 attached between the core rods 63 and 64 and vertical posts 66 fastened to the base 10. The core rods 63 and 64 of the solenoids 61 and 62 are horizontally disposed, their center lines, if extended, meeting substantially at the center of one of the articles being weighed when such article is on the receiver 40 in weighing position (Fig. III). As can be seen in Fig. II, energization of the solenoid 61 extends the core rod 63 thereof and propels an article located on the receiver 40 into the trough 59 leading to a receptacle for articles within the tolerance. Similarly, energization of the solenoid 62 propels such article into the trough 60 leading to a "reject" receptacle.

Attached to the upper end of the indicator 28 (Figures VI and VII) is a contact leaf 67 which extends at right angles to the plane of movement of the indicator 28 through an aperture in the rear of the housing 27 and into a contact housing 68. The rearward end of the leaf 67 extends between the ends of two adjustable contacts 69 and 70. The two contacts 69 and 70 are threaded through the end walls of the contact housing 68 and have knurled knobs 71 attached to their outermost ends. Nuts 72 are threaded on the shafts of the contacts 69 and 70 and can be tightened against the end walls of the housing 68 to hold the contacts 69 and 70 in the position in which they are set.

The contacts 69 and 70 may be moved horizontally with relation to the vertical position assumed by the indicator 28 and the leaf 67 when the weighing scale is at balance. The weight necessary to bring the scale to the position of balance is that weight which is established by weighing a master article to be tested and by counterbalancing its weight with the poise 58 slidable along the tare beam 57. The distance between the contacts 69 and 70 on either side of such vertical balance point determines the maximum tolerance of the article to be weighed and graded on the apparatus. Such tolerance may therefore be the same amount above and below the balance point or, by adjusting one of the contacts 69 and 70 alone, the "over" tolerance may be greater than the "under" tolerance or vice versa.

*Operation*

As just explained, the balance point of the apparatus is determined by either placing a master article on the receiver 40 and counterbalancing it by means of the poise 58, or, if the weight of the article is known, the poise 58 may be positioned with regard to indicia on the tare beam 57. Whichever method is used, this balance point must first be established before the apparatus is operated. Articles to be tested (in the embodiment of the invention illustrated, these articles are shown as golf balls) are loaded into the tube 44. The first ball within the tube 44 is permitted to roll down the tube by manually rocking the latch 46, or such first article may be placed on the receiver 40.

A master switch 73 (Fig. VIII) is closed and current flows from one side of a main power line 74, through a lead 75, a timer 76 and a lead 77 to the other side of the main power line. The timer 76 has a rotatable cam 78 on the surface of which rides one leaf of a contact 79. During the rotation of the timer, there is sufficient time for the weighing of an article placed on the receiver 40. If the article is within the specified tolerance, the indicator 28 and leaf 69 will be located between and free from contact with the contacts 69 and 70. If, however, the article is either too heavy or too light, the leaf 67 will make contact with either the contact 70 or the contact 69.

Assuming that the weight of the article falls within the specified tolerance, when the timer has rotated far enough for the cam 78 to close the contact 79, current flows through the contact 79, a lead 80 and the solenoid 51 and then through the lead 77 to the other side of the line. Energization of the solenoid 51 moves the core rod 53 (Fig. IV) downwardly and rocks the latch 46 which permits the next article to be weighed to move down to a position between the arms 47 and against the lower of the two arms 47. Current also flows through a normally closed contact 81 of a relay 82, a normally closed contact 83 of a sensitive relay 84 which is connected to the contact 81, a lead 85, the coil of a relay 86 and the lead 77 to the opposite side of the line. This energizes the relay 86 which closes normally open contacts 87 and 88. Closing of the contact 88 "seals in" the relay 86 as current can now flow through the contact 79, the lead 80, the contact 88, the coil of the relay 86 and the lead 77 to the opposite side of the line. Closing of the contact 87 permits current to flow through the lead 75, a lead 89, the contact 87, a lead 90, the solenoid 61 and the lead 77 to the opposite side of the line. Energization of the solenoid 61 moves the core rod 63 to the right (Figure III) and propels the ball resting on the receiver 40 down the trough 59 which leads to a case or box for balls the weight of which is within the specified tolerance. The timer in the meantime has rotated the cam 78 further and now the contact 79 opens, which de-energizes the coil of the relay 86 thus opening the contact 87 and de-energizing the solenoid 61. The spring 65 retracts the core rod 63. Opening of the contact 79 also de-energizes the solenoid 51 and the spring 55 retracts the core rod 53 and rocks the latch 46 back to the position shown in Fig. IV which permits the ball held between its arms in the operations just described to roll downward onto the receiver 40.

During the further rotation of the timer 76 and the cam 78, this ball is weighed on the scale and, if it falls within the tolerance, the operations above described repeat. If, however, it weighs either too much or too little, the leaf 67 will close contact with one or the other of the contacts 69 or 70. When the master switch 73 is closed, current also flows through the lead 75, the lead 89 and a lead 91 into a contact amplifier 92 (shown by the dotted lines in Fig. VIII) and through the contact amplifier to the lead 77 on the other side of the line. Since the indicator 28 is connected to the contact amplifier through a lead 93 and the contacts 69 and 70 are connected in a common lead 94 to the contact amplifier, if the leaf 67 is in contact with either of the contacts 69 and 70, the contact amplifier will close the sensitive relay 84. The timer 76 rotates the cam 78 further and closes the contact 79. This positions another ball between the arms of the latch 46 by energizing the solenoid 51 as above described. Current now flows from one side of the line through the lead 75, the contact 79, the lead 80, a normally closed contact 95 of the relay 86, a lead 96, the now closed contact 97 of the sensitive relay 84, and a lead 98 to the coil of the relay 82 and then to the lead 77 and the opposite side of the line. The coil of the relay 82 is thus energized which closes normally open contacts 99 and 100, and opens the normally closed contact 81 which prevents current from reaching the coil of the relay 86. Closing of the contact 100, "seals in" the relay 82 by permitting current to flow from one side of the line through the lead 75, the contact 79, the lead 80, the contact 100, the lead 98, the coil of the relay 82 and the lead 77 to the opposite side of the line. Closing of the contact 99 permits current to flow from one side of the line through the lead 75, the lead 89, the contact 99, a lead 101 and the solenoid 62 and then through the lead 77 to the other side of the line. Energization of the solenoid 62 moves the core rod 64 which propels the ball on the receiver 40 down the trough 60 leading to the reject box. The timer 76 and cam 78 rotates further which opens the contact 79 and de-energizes the relay 82. The spring 55 retracts the core rod 53 and rocks the latch 46 permitting the next ball to roll onto the receiver 40.

The interconnection between the relays 82 and 86 prevents energization of one of the relays if the other relay has been energized. This is necessary because of the fact that, although the sensitive relay 84 determines which of the relays 82 and 86 will be energized upon closing of the contact 79, the reaction caused on the receiver 40 and the scale by the propulsion of the ball from the receiver 40 might cause the leaf 67 to make contact or to break contact with the contacts 69 and 70 which would cause the sensitive relay 84 to change and might energize the relays 82 and 86 at the same time. This, of course, would cause both core rods 63 and 69 to extend and might jam the ball between the troughs 59 and 60.

The embodiment of the invention that has been disclosed may be modified to meet various requirements.

Having described the invention, I claim:

1. In a weighing scale, in combination, automatic load counterbalancing mechanism, an article receiver operatively connected to said automatic load counterbalancing mechanism, means for varying the balance of said automatic load counterbalancing mechanism to correspond to the pre-established correct weight for such article, electrically operated means for periodically feeding one of such articles onto said article receiver, an indicator attached to said load counterbalancing mechanism, variable tolerance sensing means located in the path of movement of said indicator on each side of the position assumed by said indicator when said automatic load counterbalancing mechanism is in a condition of balance, electrically operated selecting means for moving such article from said article receiver in one direction, electrically operated rejecting means for moving such article from said article receiver in another direction and electrical means including a timer connecting said feeding means, said tolerance sensing means, said selecting means and said rejecting means, said tolerance sensing means alternatively conditioning said electrical means to operate said selecting means if such article being weighed falls within the tolerance established by said variable tolerance sensing means and to operate said rejecting means if the weight of such article falls without such tolerance.

2. In a classifying scale, in combination, automatic load counterbalancing mechanism, an article receiver operatively connected to said automatic load counterbalancing mechanism, means for adjusting said counterbalancing mechanism to the correct weight of the articles to be sorted, electrically operated means for periodically feeding one of such articles onto the article receiver, contacts for energizing electrical circuits when the sample weight exceeds prescribed limits, electrically operable mechanism actuated only when the weight of the article is within limits for removing the weighed article from the article receiver, similar electrically operable mechanism actuated only when the weight of the article exceeds the limits for removing the article, a timer for controlling the sequence of operations, and electrical means connecting the timer, the weight limit contacts and the selecting and rejecting mechanisms.

MARK A. WECKERLY